United States Patent [19]
Rush

[11] 3,791,409
[45] Feb. 12, 1974

[54] TEMPERATURE ADJUSTING WATER FAUCET DEVICE

[75] Inventor: James M. Rush, Laurens, S.C.

[73] Assignee: The Raymond Lee Organization, Inc., New York, N.Y.

[22] Filed: July 7, 1972

[21] Appl. No.: 269,514

[52] U.S. Cl............ 137/597, 137/559, 137/625.41
[51] Int. Cl............................................ F16k 19/00
[58] Field of Search . 137/625.41, 625.48, 603, 597, 137/559

[56] References Cited
UNITED STATES PATENTS

| | | | |
|---|---|---|---|
| 2,707,486 | 5/1955 | Johns | 137/625.41 |
| 2,949,933 | 8/1960 | Moen | 137/625.41 X |
| 3,606,912 | 9/1971 | Fox | 137/559 |
| 2,839,081 | 6/1958 | Wolf | 137/597 X |
| 3,286,720 | 11/1966 | Mongerson | 137/625.41 X |
| 3,329,162 | 7/1967 | Sanford | 137/597 |
| 3,442,291 | 5/1969 | Carls | 137/625.41 |
| 3,448,755 | 6/1969 | Symmons | 137/597 X |
| 3,542,066 | 11/1970 | Cordova | 137/597 |
| 3,696,833 | 10/1972 | Low et al. | 137/559 |
| 3,706,324 | 12/1972 | Lyon | 137/625.41 |

Primary Examiner—Samuel Scott
Attorney, Agent, or Firm—Daniel Jay Tick

[57] ABSTRACT

A swivel spout provides water at different water temperatures solely in accordance with the position of the swivel spout. A cylindrical rotary valve has an axially rotatable inner core affixed to and rotatable with the spout for directing water from hot and cold water conduits through the spout.

6 Claims, 7 Drawing Figures

PATENTED FEB 12 1974  3,791,409

TEMPERATURE ADJUSTING WATER FAUCET DEVICE

DESCRIPTION OF THE INVENTION

The present invention relates to a temperature adjusting water faucet device.

The principal object of the invention is to provide a temperature adjusting water faucet device of simple and sturdy structure for providing water at different water temperatures solely in accordance with the position of a swivel spout.

In order that the invention may be readily carried into effect, it will now be described with reference to the accompanying drawing, wherein.

In the FIGS., the same components are identified by the same reference numerals.

Figure 4:
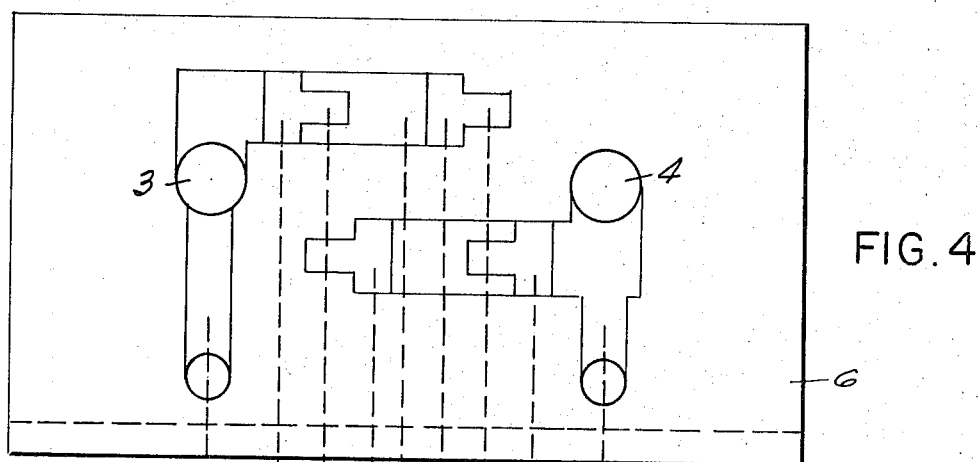
FIG. 4 is a plan view of an embodiment of the water port jacket of the invention.

The temperature adjusting water faucet device of the invention has a swivel spout 1 (FIG. 1) for providing water at different water temperatures solely in accordance with the position of the swivel spout. The faucet device of the invention comprises a cylindrical rotary valve. The rotary valve has an axially rotatable inner core 2 (FIGS. 1, 2, 3, 4, 6 and 7) affixed to and rotatable with the spout 2 for directing water from hot and cold water conduits 3 and 4 (FIGS. 1, 4 and 5).

A spray outlet 5 (FIGS. 1, 2, 3 and 6) extends from the inner core 2 in spaced relation with the spout 1 and provides a water spray when the spout is dry or is not supplying water.

The rotary valve further comprises a tubular water port jacket 6 (FIGS. 1, 4 and 5) coaxially positioned around the inner core 2. The water port jacket 6 has hot and cold water slots 7 (FIG. 5) indented on the outer surface 8 thereof (FIG. 5) and conduits 9 and 10 (FIG. 5) formed therethrough from the water slots to the inner surface 11 thereof (FIG. 5).

Figure 1:
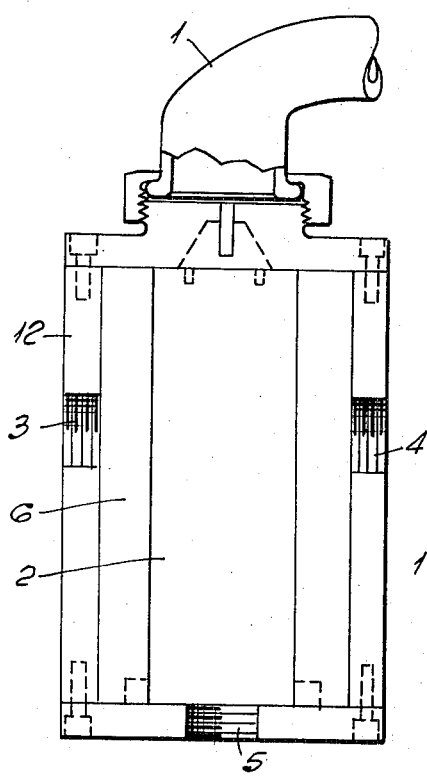
FIG. 1 is a view, partly in section, of an embodiment of the temperature adjusting water faucet device of the invention.
Figure 2:
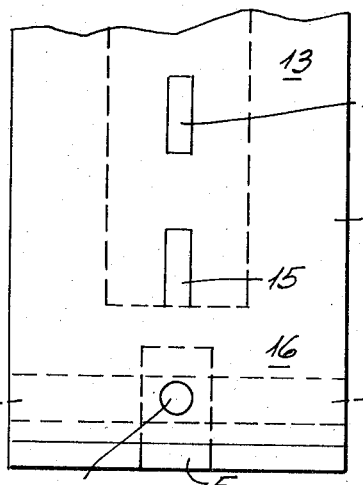
FIG. 2 is a plan view of an embodiment of the inner core of the device of the invention.
Figure 3:
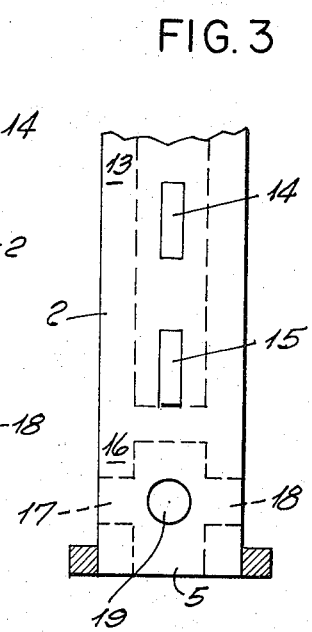
FIG. 3 is a schematic diagram of the inner core of the device of the invention.
Figure 5:
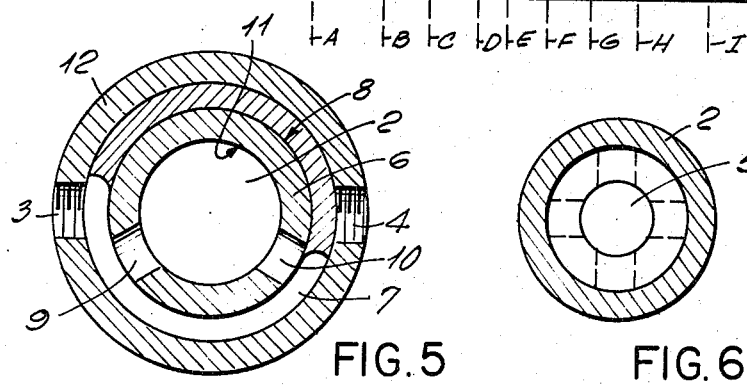
FIG. 5 is a cross-sectional view of the temperature adjusting water faucet device of the invention.
Figure 6:
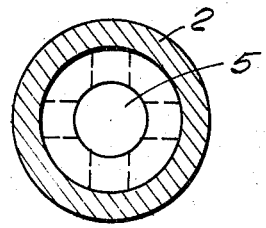
FIG. 6 is a bottom view of the inner core of the device of the invention.
Figure 7:
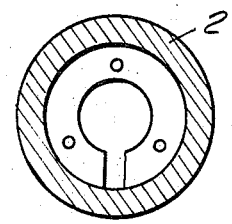
FIG. 7 is a top view of the inner core of the device of the invention.

The rotary valve further comprises a tubular outer housing 12 (FIGS. 1 and 5). The water port jacket 6 is coaxially press fit in the outer housing 12 and is stationary. The inner core 2 fits water tight into the water port jacket 6.

The water port jacket 6 has the water ports 3 and 4 (FIGS. 1, 4 and 5) therein. That is, the outer housing 12 accommodates the hot and cold water conduits 3 and 4 and directs them to the water port jacket 6. The inner core 2 has an upper half 13 (FIGS. 2 and 3) and a pair of water slots 14 and 15 in said upper half adapted to be aligned with the water ports 9 and 10 of the water port jacket 6 in selected positions of the inner core for supplying hot and cold water to the spout 1.

The inner core 2 has a lower half 16 (FIGS. 2 and 3) and ports 17, 18 and 19 (FIGS. 2 and 3) in said lower half adapted to be aligned with water ports 9 and 10 of the water port jacket 6 in selected other positions of said inner core for supplying warm water to the spout 1.

The inner core 2 and the water port jacket 6 preferably comprise Teflon. The outer housing 12 preferably comprises stainless steel or brass.

A viewing window may be provided at the base of the spout 1, as shown in FIG. 4. The viewing window indicates the water supplied to the spout 1 thereby substantially indicating the temperature of the water provided by the spout. When the condition A, E or I is viewed via the window, no water is provided via the spout 1 and spray is provided via the spray outlet 5. When the condition B or F is viewed via the window, hot water is provided via the spout 1. When the condition C or G is viewed via the window, warm water is provided via the spout 1. When the condition D or H is viewed via the window, cold water is provided via the spout 1.

While the invention has been described by means of specific examples and in specific embodiments, I do not wish to be limited thereto, for obvious modifications will occur to those skilled in the art without departing from the spirit and scope of the invention.

I claim:

1. A temperature adjusting water faucet device having a swivel spout for providing water at different water temperatures solely in accordance with the position of said swivel spout, said faucet device comprising a cylindrical rotary valve of unitary structure having an axially rotatable inner core affixed to and rotatable with the spout for directing water from hot and cold water conduits through said spout; a spray outlet spaced from the spout and extending from the inner core for providing a water spray when the spout is dry; and a viewing window at the base of the spout for indicating the water supplied to the spout thereby substantially indicating the temperature of the water provided by the spout.

2. A temperature adjusting water faucet device as claimed in claim 1, wherein the rotary valve comprises a tubular water port jacket coaxially positioned around the axially rotatable inner core and having hot and cold water slots indented on the outer surface thereof and conduits formed therethrough from the water slots to the inner surface thereof.

3. A temperature adjusting water faucet device as claimed in claim 2, wherein the rotary valve further comprises a tubular outer housing and wherein the water port jacket is coaxially press fit into the outer housing and is stationary and the inner core fits water tight into the water port jacket.

4. A temperature adjusting water faucet device as claimed in claim 3, wherein the water port jacket has water ports therein and the inner core has an upper half and a pair of water slots in the upper half thereof adapted to be aligned with water ports of the water port jacket in selected positions of the inner core for supplying hot and cold water to the spout and a lower half and ports in the lower half thereof adapted to be aligned with water ports of the water port jacket in selected other positions of the inner core for supplying warm water to the spout.

5. A temperature adjusting water faucet device as claimed in claim 4, wherein the outer housing accommodates hot and cold water conduits and directs them to the water port jacket.

6. A temperature adjusting water faucet device as claimed in claim 5, wherein the inner core and the water port jacket comprise Teflon and the outer housing comprises one of stainless steel or brass.

* * * * *